Patented Aug. 6, 1940

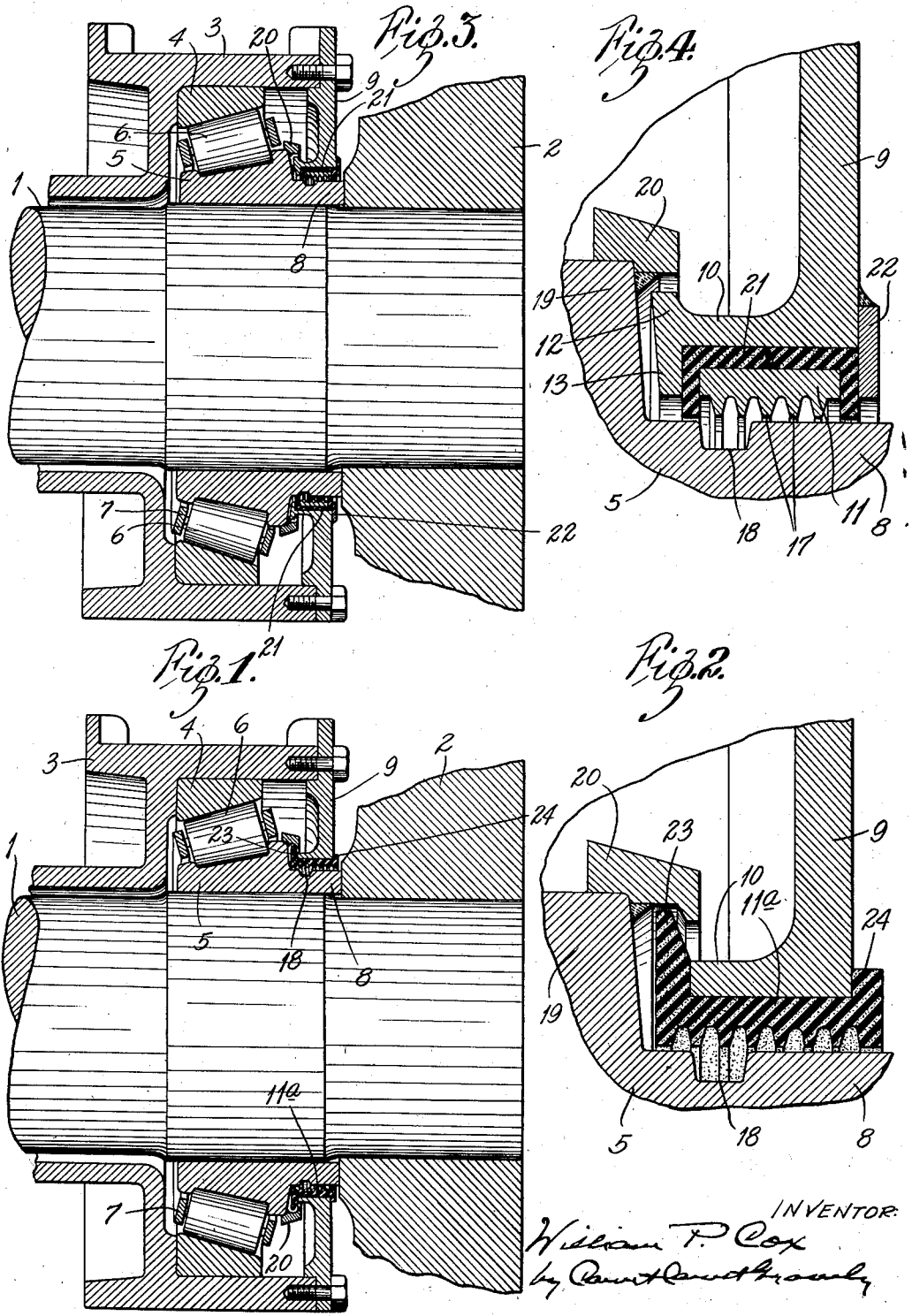
Aug. 6, 1940. W. P. COX 2,210,543
END CLOSURE FOR AXLE HOUSING
Filed March 26, 1938
INVENTOR:
William P. Cox
HIS ATTORNEYS.

2,210,543

UNITED STATES PATENT OFFICE 2,210,543

END CLOSURE FOR AXLE HOUSING

William P. Cox, Canton, Ohio, assignor to The Timken Roller Bearing Company, Canton, Ohio, a corporation of Ohio Application March 26, 1938, Serial No. 198,203

4 Claims. (Cl. 308—187.1)

My invention relates to axle constructions of the type wherein an axle or shaft projects beyond the end of a housing and a roller bearing is interposed between the axle and the housing. The principal object of the invention is to devise means which will prevent the escape of lubricant and will remain operative even when the axle shifts from its correct posititon in relation to the housing. The invention consists in the parts and combinations of parts hereinafter described and claimed.

In the accompanying drawing which forms part of this specification and wherein like numerals refer to like parts wherever they occur, Fig. 1 is a longitudinal sectional view of a portion of an axle construction embodying my invention;

Fig. 2 is an enlarged longitudinal section of a portion of the axle shown in Fig. 1; and Figs. 3 and 4 are views similar to Figs. 1 and 2, respectively, showing a modification of the construction.

The axle construction shown in Fig. 1 is of the locomotive driving axle type. It comprises a horizontal axle 1 having a driving wheel 2 secured on its end, a hollow housing 3 and a taper roller bearing interposed between the axle and the housing. This bearing comprises a cup or outer raceway member 4 seated in the enlarged end of the housing, a cone or inner raceway member 5 secured on the axle, a series of taper rollers 6 interposed between the two raceway members and a cage 7 for spacing said rollers apart. The cone or inner raceway member has an extension 8 at its outer end which bears against the hub of the wheel.

Secured to the end of the housing is a closure plate 9 with a tubular or hub-like extension 10 whose bore is enough larger than the outer end extension 8 of the inner raceway member to accommodate the sealing ring 11a hereinafter described. The extension 10, that is, the wall of the bore is elongated longitudinally of the axle.

The extension 8 of the cone or inner bearing member, that is, the portion beyond the thrust rib thereof, is of relatively small diameter and has a relatively large circumferential groove 18 in its surface opposite the inner end portion of the sealing ring.

Mounted on and extending beyond the end of the thrust rib portion 19 of the inner bearing member is a ring 20 whose outer surface preferably tapers toward the body of the closure plate. By this arrangement, there is a tendency for centrifugal force to fling the oil on the tapered ring 20 back into the bearing; but any oil dripping from the small end of said ring will fall on the outer surface of the hub and flow to the bottom of the housing.

The sealing ring 11a is preferably made of resilient material, such as rubber or synthetic rubber, with annular grooves in its inside wall. At its ends, the sealing ring has outwardly extending annular flanges 23, 24 intended to fit against the end faces of the hub of the closure plate. The flange 23 at the inner end of the hub is spaced from the body of the closure plate and forms therewith a groove into which oil may drip from the drip edge of the ring 20. In the normal position of the parts, there is some clearance between the sealing ring and the axle. In this construction, the loosening of the bearing allows the housing to drop and bring the sealing ring into contact with the axle without relieving the bearing from its duty of carrying the load of the housing. As the looseness of the bearing increases and the housing drops further, part of the load of the housing is transmitted through the sealing ring which, being compressible and capable of transmitting a considerable portion of the housing load to the axle, yields resiliently to the pressure and relieves the bearing of only a portion of the total load. In this way, the construction permits the axle member or shaft to shift considerably from its correct position without being scored and without permitting leakage or subjecting the end closure and its bolts to undue stress.

The construction illustrated in Figs. 3 and 4 are similar to the construction of Figs. 1 and 2, hereinbefore described. In the construction of Figs. 3 and 4, however, a bronze sealing ring 11 is enclosed in a channel-shaped ring 21 of elastic material, such as rubber or synthetic rubber, and which, for convenience of assembly, may be made in the form of two angular rings. This ring of elastic material fits in the cylindrical bore of the hub-like extension 10 of the closure plate with its inner end bearing against an inwardly extending annular flange 13 on the end of the extension 10 and with its outer end substantially flush with the outer face of the extension where it is held by a retaining ring 22 which is welded to the outer end of said extension 10 and overlaps the end of the cushioning ring 21. The sealing ring 11 is preferably provided with a series of annular ribs 17 on its inner surface. Normally these ribs are slightly clear of the axle member but contact therewith when the housing drops due to the loosening of the bearing. As the loosening of the bearing increases, more and more of the housing load is transmitted to the axle member through the oil sealing means, that is, through the cushioning ring to the bronze sealing ring and thence to the axle member.

What I claim is:

1. The combination of a housing with a perforated extension in the end thereof, which extension has a plain bore extending therethrough, an axle member extending through said bore, and a sealing ring of elastic material having a barrel portion fitting in said bore with its inside surface close to the axle member and provided at its ends with flanges which extend radially outward and overlap the ends of said extension, the radially outermost portion of the flange at the inner end of said ring being spaced from the end of the housing to form an oil channel.

2. The combination of a housing with a perforated extension in the end thereof, which extension has a plain bore extending therethrough, an axle, a roller bearing between said housing and axle with the inner raceway member extending through said bore, said inner raceway member having a drip edge projecting over the inner end of said extension, and a sealing ring of elastic material having a barrel portion fitting in said bore with its inside surface close to said inner raceway member and provided at its ends with flanges which extend radially outward beyond the ends of said extension, the flange inside of the housing being spaced from the end of the extension to form therewith an oil groove to receive the drip from said drip edge.

3. The combination of a housing with an axle opening in the end thereof and a tubular flange defining said opening, an axle member extending horizontally through said opening with radial clearance between the top of said axle member and said housing, a roller bearing between said housing and said axle member and a one-piece resiliently compressible sealing ring mounted in said flange clear of the top portion of the axle member by an amount less than said first mentioned clearance.

4. The combination of a housing with a cylindrical extension in the end thereof, which extension has a plain bore extending therethrough, an axle member extending through said bore with clearance between the top of said axle and said extension, a roller bearing between said housing and said axle member and a sealing ring of load supporting resiliently compressible material having a barrel portion fitting in said bore with its inside surface clear of the axle member by an amount less than said first mentioned clearance and provided at its ends with flanges which extend radially outward and overlap the ends of said extension.

WILLIAM P. COX.